United States Patent
Matsubara

(10) Patent No.: US 10,649,192 B2
(45) Date of Patent: May 12, 2020

(54) PHASE-CONTRAST MICROSCOPE AND IMAGING METHOD

(71) Applicant: FUJIFILM Corporation, Tokyo (JP)

(72) Inventor: Kenta Matsubara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 130 days.

(21) Appl. No.: 15/850,969

(22) Filed: Dec. 21, 2017

(65) Prior Publication Data

US 2018/0113295 A1 Apr. 26, 2018

Related U.S. Application Data

(63) Continuation of application No. PCT/JP2016/063804, filed on May 10, 2016.

(30) Foreign Application Priority Data

Jun. 30, 2015 (JP) .................................. 2015-130873

(51) Int. Cl.
  *G02B 21/14* (2006.01)
  *G02B 21/26* (2006.01)
  (Continued)

(52) U.S. Cl.
  CPC .............. *G02B 21/14* (2013.01); *G02B 7/28* (2013.01); *G02B 7/282* (2013.01); *G02B 7/36* (2013.01);
  (Continued)

(58) Field of Classification Search
  CPC .......... G02B 21/14; G02B 7/28; G02B 7/282; G02B 7/36; G02B 21/0004; G02B 21/06;
  (Continued)

(56) References Cited

U.S. PATENT DOCUMENTS 5,420,717 A * 5/1995 Tabata ................. G02B 5/3083
  359/371
2004/0125373 A1* 7/2004 Oldenbourg ....... G02B 21/0004
  356/364

(Continued)

FOREIGN PATENT DOCUMENTS

JP 2007-293267 A 11/2007
JP 2007-316133 A 12/2007
  (Continued)

OTHER PUBLICATIONS

Japanese Notification of Reasons for Refusal for corresponding Japanese Application No. 2015-130873, dated Aug. 21, 2018, with machine translation.
  (Continued)

*Primary Examiner* — Derek S. Chapel
*Assistant Examiner* — Adam W Booher
(74) *Attorney, Agent, or Firm* — Birch, Stewart, Kolasch & Birch, LLP

(57) ABSTRACT

A culture vessel that houses a culture liquid and a specimen is irradiated with pattern light having a pattern that is previously set for the culture vessel. Transmitted light transmitted through the culture liquid in the culture vessel because of the irradiation with the pattern light is detected. Optical characteristics of an adjusting optical system that adjusts refraction of light caused by the shape of the liquid surface of the culture liquid in the culture vessel are adjusted, on the basis of a detection signal based on the detected transmitted light. After the adjustment, the culture vessel is irradiated with illumination light for phase-contrast measurement, and the specimen irradiated with the illumination light is imaged.

21 Claims, 8 Drawing Sheets

(51) Int. Cl.
- *G02B 7/36* (2006.01)
- *G02B 21/06* (2006.01)
- *G02B 7/28* (2006.01)
- *G02B 21/00* (2006.01)

(52) U.S. Cl.
CPC ......... *G02B 21/0004* (2013.01); *G02B 21/06* (2013.01); *G02B 21/26* (2013.01)

(58) Field of Classification Search
CPC .. G02B 21/26; G02B 21/0056; G02B 21/006; G02B 21/241; G02B 21/244–245
USPC .................................................. 359/386, 398
See application file for complete search history.

(56) References Cited

U.S. PATENT DOCUMENTS

| | | | |
|---|---|---|---|
| 2012/0257040 A1 | 10/2012 | Koebler et al. | |
| 2014/0193892 A1* | 7/2014 | Mohan | G01N 21/05 435/287.2 |
| 2015/0029326 A1* | 1/2015 | Backman | G02B 21/365 348/80 |
| 2015/0278625 A1* | 10/2015 | Finkbeiner | G02B 21/26 348/79 |
| 2015/0309296 A1* | 10/2015 | Dowaki | G02B 21/14 359/363 |
| 2018/0113294 A1* | 4/2018 | Shiraishi | G02B 21/14 |

FOREIGN PATENT DOCUMENTS

| | | |
|---|---|---|
| JP | 2009-122356 A | 6/2009 |
| JP | 2010-271537 A | 12/2010 |
| WO | WO 2014/091661 A1 | 6/2014 |

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/063804, dated Jan. 11, 2018, with an English translation.

International Search Report and English translation (Form PCT/ISA/210) for Application No. PCT/JP2016/063804, dated Jul. 19, 2016.

Extended European Search Report for European Application No. 16817560.2, dated May 30, 2018.

* cited by examiner

I POSITION ADJUSTMENT OF OPTICAL ELEMENT

II OPTICAL AXIS ROTATION ADJUSTMENT

III FOCAL POWER ADJUSTMENT

I  II  III  IV  V

I  II

I  II

PHASE-CONTRAST MICROSCOPE AND IMAGING METHOD

CROSS-REFERENCE TO RELATED APPLICATIONS

This application is a Continuation of PCT International Application No. PCT/JP2016/63804, filed on May 10, 2016, which claims priority under 35 U.S.C. § 119(a) to Japanese Patent Application No. 2015-130873, filed on Jun. 30, 2015. Each of the above application(s) is hereby expressly incorporated by reference, in its entirety, into the present application.

BACKGROUND OF THE INVENTION

1. Field of the Invention

The present invention relates to a phase-contrast microscope and an imaging method that each execute phase-contrast measurement on a specimen in a liquid.

2. Description of the Related Art

In recent years, phase-contrast measurement has been beginning to be widely used as a method of observing cultured transparent cells such as stem cells in an achromatic manner. A phase-contrast microscope has been used as one that executes such phase-contrast measurement.

In a typical phase-contrast microscope, a specimen is irradiated with ring-shaped illumination light, and direct light passing through the specimen and diffracted light are incident on a phase plate. The direct light is reduced by a ring part of the phase plate, the diffracted light passes through a transparent part of the phase plate, the direct light and diffracted light form an image, and hence an image with a contrast of light and shade can be captured.

For example, when cells in a culture liquid are observed with a phase-contrast microscope, a meniscus is formed at the liquid surface of the culture liquid because of the influence of the surface tension of the culture liquid. Then there may be a problem in which the lens effect of the meniscus causes the optical axis of the ring-shaped illumination light to be shifted, the shift influences the direct light and diffracted light that are incident on the phase plate, and a clear phase-contrast image is not obtained.

FIG. 10 shows example images when cells in a culture liquid are imaged by using a conventional phase-contrast microscope. Part I in FIG. 10 is an overall image, and Part II in FIG. 10 is an enlarged image of a part of the overall image shown in Part I in FIG. 10. As shown in FIG. 10, it is found that an artifact is generated at the center of the image due to the influence of the meniscus and the contrast of the cell image is low.

In contrast, FIG. 11 shows example images when cells are imaged by using a conventional phase-contrast microscope in a state without a culture liquid. Part I in FIG. 11 is an overall image, and Part II in FIG. 11 is an enlarged image of a part of the overall image shown in Part I in FIG. 11. As shown in FIG. 11, if a culture liquid is not present, a high-contrast cell image can be obtained; however, the culture of the cells cannot be continued in the state without a culture liquid.

To reduce the above-described influence of the meniscus of the culture liquid, various methods have been suggested. For example, JP2010-271537A suggests to detect, with a pupil image detector, the shape of a ring-shaped phase film at a pupil position of an objective lens and the shape of ring-shaped illumination light that is formed by an optical element, and to control the shape of a ring-shaped opening of the optical element on the basis of the detected coordinate data.

Also, JP2007-293267A suggests, with regard to that the optical axis of illumination light is shifted not because of the influence of the meniscus but because of curvature of the bottom surface of a culture vessel or inclination of the culture vessel, to detect the shift of the optical axis of the illumination light and to move a phase plate in accordance with the shift of the optical axis.

Also, JP2009-122356A suggests that a user moves a slit plate or a phase plate, and records the position of the moved slit plate or phase plate to reduce the influence of the meniscus.

SUMMARY OF THE INVENTION

However, the method described in JP2010-271537A detects the shape of the phase film and the shape of the ring-shaped illumination light as images, and controls the optical element on the basis of the coordinate data of the detected images. Deforming the ring-shaped image is not simple, and hence time is required for arithmetically operating a control signal of the optical element.

Also, the method described in JP2007-293267A adjusts the shift of the optical axis of the illumination light because of the curvature of the bottom surface of the culture vessel or the inclination of the culture vessel as described above. JP2007-293267A does not suggest a specific method of reducing the influence of the meniscus of the culture liquid.

Also, JP2009-122356A discloses that the user moves the slit plate or the phase plate to reduce the influence of the meniscus; however, does not suggest at all a method of automatically and quickly eliminating the influence of refraction of the illumination light caused by the meniscus.

In light of the above-described problems, it is an object of the present invention to provide a phase-contrast microscope and an imaging method that each can automatically and quickly adjust the influence of refraction of illumination light caused by a meniscus.

A phase-contrast microscope according to an aspect of the present invention includes a phase-contrast-measurement illumination-light irradiation unit that irradiates a vessel that houses a liquid and a specimen, with illumination light for phase-contrast measurement; an imaging unit that images the specimen irradiated with the illumination light; an adjusting optical system that has adjustable optical characteristics and adjusts refraction of the illumination light caused by a shape of a liquid surface of the liquid in the vessel in accordance with the optical characteristic; a pattern-light irradiation unit that irradiates the liquid surface of the liquid in the vessel with pattern light having a pattern that is previously set for the vessel; a transmitted-light detection unit that detects transmitted light transmitted through the liquid surface of the liquid in the vessel because of the irradiation with the pattern light; and an adjusting-optical-system control unit that adjusts the optical characteristics of the adjusting optical system on the basis of a detection signal based on the transmitted light detected by the transmitted-light detection unit.

The above-described phase-contrast microscope according to an aspect of the present invention may further include an image forming optical system that forms an image of the specimen caused by the irradiation with the illumination light, on the imaging unit, and is subject to automatic focus control; a reflected-light detection unit that detects reflected light of the pattern light reflected from a bottom surface of the vessel because of the irradiation with the pattern light; and an image-forming-optical-system control unit that executes the automatic focus control on the image forming optical system on the basis of a detection signal based on the reflected light detected by the reflected-light detection unit.

In the above-described phase-contrast microscope according to an aspect of the present invention, the adjusting-optical-system control unit may adjust the optical characteristics of the adjusting optical system on the basis of at least one evaluation result of evenness or contrast of the detection signal based on the transmitted light.

The above-described phase-contrast microscope according to an aspect of the present invention may further include a filter unit that reduces incidence on the transmitted-light detection unit of reflected light of the illumination light reflected from the liquid surface of the liquid in the vessel because of the irradiation with the illumination light.

In the above-described phase-contrast microscope according to an aspect of the present invention, the filter unit may have spectral characteristics that are changeable in accordance with a wavelength of the illumination light.

In the above-described phase-contrast microscope according to an aspect of the present invention, the pattern light may have a streak-shaped pattern.

In the above-described phase-contrast microscope according to an aspect of the present invention, the adjusting-optical-system control unit may adjust the optical characteristics of the adjusting optical system after the automatic focus control by the image-forming-optical-system control unit.

In the above-described phase-contrast microscope according to an aspect of the present invention, the adjusting optical system may have an optical element having an adjustable focal power.

In the above-described phase-contrast microscope according to an aspect of the present invention, the optical element may have a curvature at at least one of an incidence surface or an exit surface of the illumination light.

In the above-described phase-contrast microscope according an aspect of to the present invention, the curvature of the optical element may be adjustable.

In the above-described phase-contrast microscope according an aspect of to the present invention, the adjusting-optical-system control unit may acquire an adjustment condition of the adjusting optical system, and adjust the optical characteristics of the adjusting optical system on the basis of the adjustment condition.

In the above-described phase-contrast microscope according an aspect of to the present invention, the adjustment condition may be determined on the basis of at least one of an optical magnification of the image forming optical system that forms the image of the specimen, a type of the vessel, a type of the specimen, the number of the specimens, a type of the liquid, an amount of the liquid, an environmental temperature, an environmental humidity, an imaging position in the vessel, or a size of an imaging region in the vessel.

In the above-described phase-contrast microscope according an aspect of to the present invention, the phase-contrast-measurement illumination-light irradiation unit may have a light source and a slit plate provided with a slit through which light emitted from the light source passes, and the specimen may be irradiated with the light passing through the slit plate, as the illumination light.

An imaging method according to an aspect of the present invention includes irradiating a liquid surface of a liquid in a vessel that houses the liquid and a specimen, with pattern light having a pattern that is previously set for the vessel; detecting transmitted light transmitted through the liquid surface of the liquid in the vessel because of the irradiation with the pattern light; adjusting optical characteristics of an adjusting optical system that adjusts refraction of light caused by a shape of the liquid surface of the liquid in the vessel in accordance with the optical characteristic, on the basis of a detection signal based on the detected transmitted light; after the adjustment, irradiating the vessel with illumination light for phase-contrast measurement; and imaging the specimen irradiated with the illumination light.

With the phase-contrast microscope and the imaging method according to an aspect of the present invention, the vessel that houses the liquid and the specimen is irradiated with the pattern light having the pattern that is previously set for the vessel, and the transmitted light transmitted through the liquid surface of the liquid in the vessel because of the irradiation with the pattern light is detected. Then, the optical characteristics of the adjusting optical system that adjusts the refraction of the light caused by the shape of the liquid surface of the liquid in the vessel are adjusted, on the basis of the detection signal based on the detected transmitted light. Accordingly, the influence of the refraction of the illumination light for phase-contrast measurement with which the vessel is irradiated can be automatically adjusted. Further, as compared with the case where the arithmetic processing is executed on the coordinate data of the above-described ring-shaped image, the arithmetic load of the arithmetic processing based on the detection signal of the pattern light can be decreased. Hence, the above-described influence of the refraction of the illumination light can be quickly adjusted.

After the optical characteristics of the adjusting optical system are adjusted, the vessel is irradiated with the illumination light for phase-contrast measurement, and the specimen irradiated with the illumination light is imaged. Accordingly, a high-contrast phase-contrast image with an artifact caused by a meniscus reduced can be captured.

DESCRIPTION OF THE PREFERRED EMBODIMENTS

Figure 1:
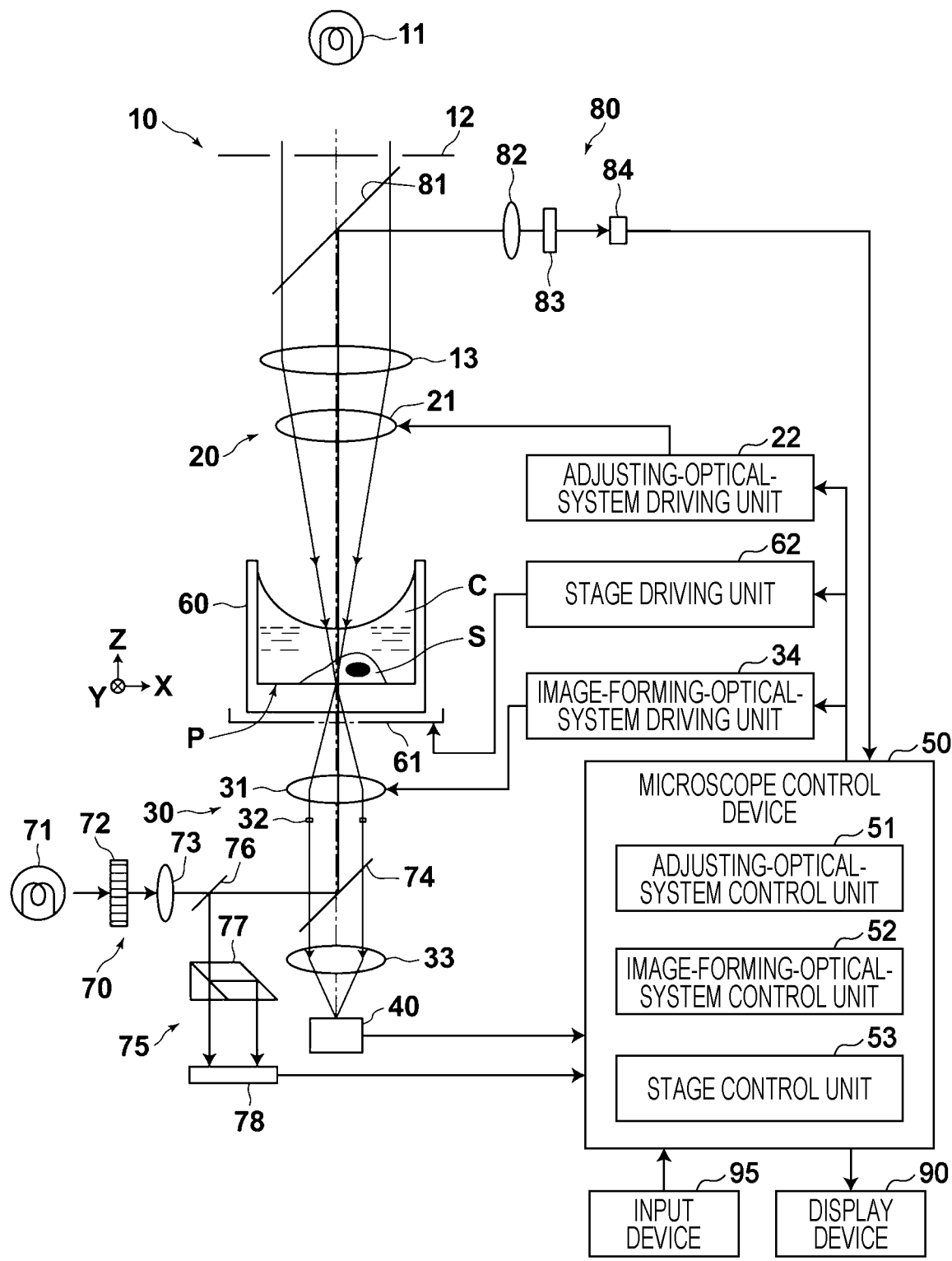
FIG. 1 is an illustration showing a general configuration of a microscope system using an embodiment of a phase-contrast microscope according to an embodiment of the present invention.

A microscope system using an embodiment of a phase-contrast microscope and an imaging method of the present invention is described below in detail with reference to the drawings. FIG. 1 is an illustration showing a general configuration of the microscope system of this embodiment.

The microscope system of this embodiment includes, as shown in FIG. 1, a phase-contrast-measurement illumination-light irradiation unit 10, an adjusting optical system 20, an image forming optical system 30, an imaging unit 40, a pattern-light irradiation unit 70, a reflected-light detection unit 75, a transmitted-light detection unit 80, a microscope control device 50, a display device 90, and an input device 95.

In the microscope system of this embodiment, a stage 61 is provided between the adjusting optical system 20 and the image forming optical system 30, and a culture vessel 60 that houses a culture liquid C being a liquid and a specimen S is installed on the stage 61. The microscope system of this embodiment includes a stage driving unit 62 that moves the stage 61 in an X direction, a Y direction, and a Z direction. The X and Y directions are directions orthogonal to each other in a plane parallel to an observation-object installation surface P. The Z direction is a direction orthogonal to the X and Y directions.

In the microscope system of this embodiment, a phase-contrast microscope main body is composed of the above-described phase-contrast-measurement illumination-light irradiation unit 10, adjusting optical system 20, image forming optical system 30, imaging unit 40, pattern-light irradiation unit 70, reflected-light detection unit 75, transmitted-light detection unit 80, stage 61, and stage driving unit 62. The microscope control device 50 controls the phase-contrast microscope main body. A specific configuration of the phase-contrast microscope main body is described below.

The phase-contrast-measurement illumination-light irradiation unit 10 irradiates the specimen S housed in the culture vessel 60, with illumination light for what is called phase-contrast measurement. In this embodiment, the irradiation is given with ring-shaped illumination light as the phase-contrast-measurement illumination light. Specifically, the phase-contrast-measurement illumination-light irradiation unit 10 of this embodiment includes a phase-contrast-measurement white-light source 11 that emits white light for phase-contrast measurement; a slit plate 12 that has a ring-shaped slit, receives the incident phase-contrast-measurement white light emitted from the phase-contrast-measurement white-light source 11, and emits ring-shaped illumination light; and a condenser lens 13 that receives the incident ring-shaped illumination light emitted from the slit plate 12, and irradiates the specimen S with the incident ring-shaped illumination light.

Figure 2:
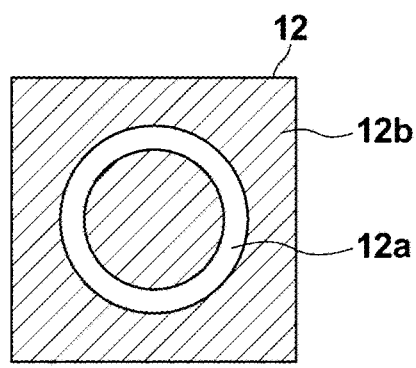
FIG. 2 is an illustration showing an example of a configuration of a slit plate.

FIG. 2 is an illustration showing a specific configuration of the slit plate 12. As shown in FIG. 2, the slit plate 12 is configured such that a ring-shaped slit 12a that transmits the phase-contrast-measurement white light emitted from the phase-contrast-measurement white-light source 11 is provided in a light screen 12b that shields the phase-contrast-measurement white light. The ring-shaped illumination light is formed because the phase-contrast-measurement white light passes through the slit 12a.

While the ring-shaped illumination light is formed by using the slit plate 12 as described above in this embodiment, the method of forming the ring-shaped illumination light is not limited thereto. Ring-shaped illumination light may be formed by using, for example, a spatial light modulation element.

While the ring-shaped illumination light is used as the phase-contrast-measurement illumination light in this embodiment, illumination light may have a structure other than the structure with the ring shape. Illumination light may have any other shape, such as a triangular shape or a quadrangular shape, as long as the shape is conjugate to the shape of a phase plate (described later).

The bottom surface of the culture vessel 60 installed on the stage 61 serves as the observation-object installation surface P. A cell group etc. is arranged as the specimen S on the observation-object installation surface P. The inside of the culture vessel 60 is filled with the culture liquid C. A concave-shaped meniscus is formed at the liquid surface of the culture liquid C. The culture vessel 60 may be, for example, a petri dish, or a well plate in which a plurality of wells are arrayed. In the case of the well plate, a specimen S and a culture liquid C are housed in each well, and a meniscus is formed in each well.

While the cell group cultured in the culture liquid serves as the specimen S in this embodiment, the specimen S is not limited to such an object in culture. The specimen S may be cells fixed in a liquid, such as water, formalin, ethanol, or methanol. Also in this case, a meniscus is formed at the liquid surface of such a liquid in a vessel.

The adjusting optical system 20 has adjustable optical characteristics, and adjusts refraction of the phase-contrast-measurement illumination light caused by the shape of the liquid surface of the above-described meniscus. The adjusting optical system 20 of this embodiment includes an adjustment optical element 21 and an adjusting-optical-system driving unit 22.

The adjustment optical element 21 has a focal power. Specifically, a liquid crystal lens whose focal power is changed by application of a voltage, a liquid lens whose lens curvature radius is changeable, a spatial light modulator whose focal length is changeable, etc., may be used. When a lens is used as the adjustment optical element 21, a plano-convex lens having a curvature at the incident surface or the exit surface thereof may be used, or a double-convex lens having curvatures at both the incident surface and the exit surface thereof may be used.

The adjusting-optical-system driving unit 22 adjusts the focal length by changing the focal power of the adjustment optical element 21 on the basis of a control signal that is output from an adjusting-optical-system control unit 51 (described later). Specifically, when the liquid crystal lens or the spatial light modulator is used as the adjustment optical element 21, a voltage corresponding to a desirable focal length is applied to the liquid crystal lens or the spatial light modulator. When the liquid lens is used as the adjustment optical element 21, the amount of liquid in the liquid lens is adjusted in accordance with a desirable focal length, and hence the curvature radius of the liquid lens is adjusted.

Figure 3:
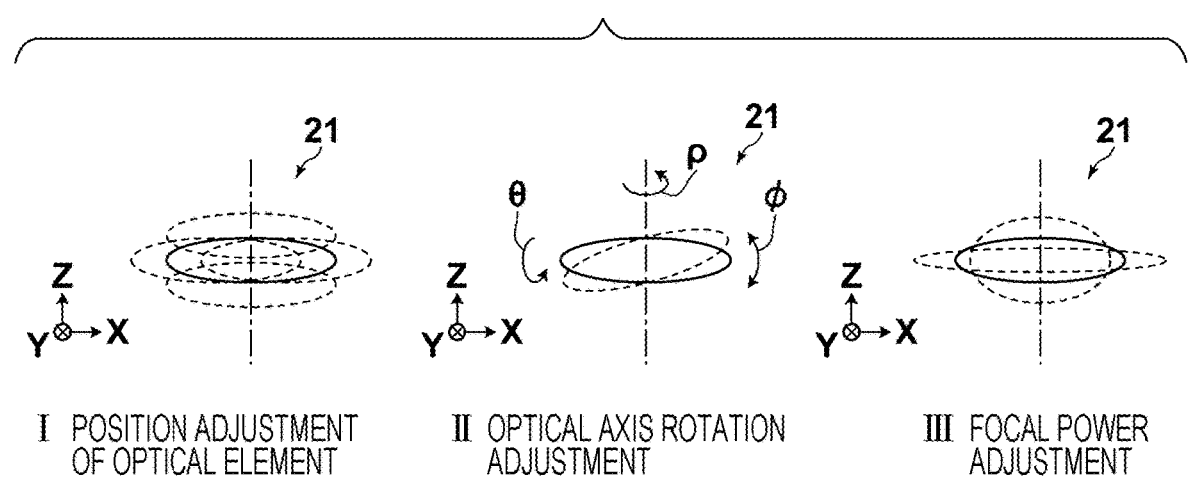
FIG. 3 provides illustrations schematically showing adjustment of the position, rotation of the optical axis, and focal power of an adjustment optical element.

Also, the adjusting-optical-system driving unit 22 includes a mechanism that changes the position of the adjustment optical element 21 and the optical-axis direction of the adjustment optical element 21 on the basis of a control signal that is output from the adjusting-optical-system control unit 51. Specifically, the adjusting-optical-system driving unit 22 includes a mechanism that can change the position of the adjustment optical element 21 in the X, Y, and Z directions. Also, the adjusting-optical-system driving unit 22 includes a mechanism that rotates the optical axis of the adjustment optical element 21. Part I in FIG. 3 is an illustration schematically showing a change in the position of the adjustment optical element 21 in the X, Y, and Z directions. Part II in FIG. 3 is an illustration schematically showing rotation adjustment around the X axis (θ), rotation adjustment around the Y axis (φ), and rotation adjustment around the Z axis (ρ) for the optical axis of the adjustment optical element 21. Part III in FIG. 3 schematically shows adjustment for the focal power of the adjustment optical element 21. While Part III in FIG. 3 shows an example of adjusting the focal power by adjusting the curvature radius of the adjustment optical element 21, the method of adjusting the focal power is not limited thereto. For example, when the liquid crystal lens or the spatial light modulator is used as the adjustment optical element 21, the focal power may be adjusted by adjusting the application voltage.

While the adjustment optical element 21 is moved in the X, Y, and Z directions in this embodiment, the adjustment optical element 21 is not necessarily moved if an effect equivalent to an optical effect caused by the movement of the adjustment optical element 21 can be obtained. For example, when the liquid crystal lens or the spatial light modulator is used as the adjustment optical element 21, an effect similar to shift of the optical axis caused by the movement of the adjustment optical element 21 may be obtained by adjusting the application voltage. Likewise, in the optical axis direction of the adjustment optical element 21, the adjustment optical element 21 itself is not necessarily rotated, and an effect similar to rotation of the optical axis caused by the rotation of the adjustment optical element 21 itself may be obtained by adjusting the application voltage.

While the adjustment optical element 21 is moved in the X, Y, and Z directions in this embodiment, it is not limited thereto. The relative positional relationship in the X, Y, and Z directions between the adjustment optical element 21 and the meniscus formed in the culture vessel 60 may be changed by moving the stage 61 in the X, Y, and Z directions.

While the single adjustment optical element 21 is used in this embodiment, the adjustment optical element 21 may be automatically switched among a plurality of adjustment optical elements 21 with different focal lengths and hence the focal power may be adjusted.

Figure 4:
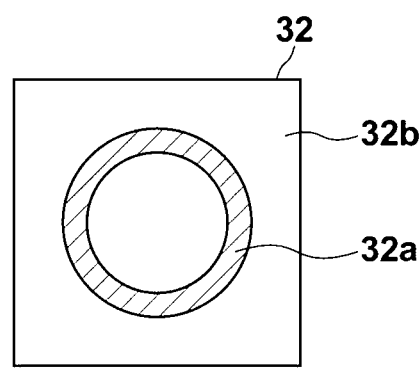
FIG. 4 is an illustration showing an example of a configuration of a phase plate.

The image forming optical system 30 includes an objective lens 31, a phase plate 32, an image forming lens 33, and an image-forming-optical-system driving unit 34. FIG. 4 is a plan view showing a specific configuration of the phase plate 32. As shown in FIG. 4, the phase plate 32 is configured such that a phase ring 32a is formed in a transparent plate 32b that is transparent with respect to the wavelength of the ring-shaped illumination light. The size of the above-described slit 12a is conjugate to the size of the phase ring 32a.

The phase ring 32a is configured such that a phase film that shifts the phase of the incident light by ¼ wavelength and a light reducing filter that reduces the incident light are formed in a ring shape. The phase of the direct light incident on the phase plate 32 is shifted by ¼ wavelength and the brightness is weakened because the direct light passes through the phase ring 32a. In contrast, a major part of the diffracted light diffracted by the specimen S passes through the transparent plate 32b of the phase plate 32, and the phase and the brightness of the diffracted light are not changed.

The objective lens 31 is moved in the Z direction by the image-forming-optical-system driving unit 34. When a phase-contrast image of the specimen S is to be captured, automatic focus control is executed by moving the objective lens 31 in the Z direction by the image-forming-optical-system driving unit 34, and the contrast of the image to be captured by the imaging unit 40 is adjusted. In this embodiment, the pattern-light irradiation unit 70 irradiates the culture vessel 60 with pattern light, the reflected-light detection unit 75 detects the reflected light reflected from the bottom surface of the culture vessel 60, and the automatic focus control is executed on the basis of the detection signal. The automatic focus control based on the detection signal of the reflected light of the pattern light is described later in detail.

The image forming lens 33 receives the incident direct light and diffracted light passing through the phase plate 32, and forms an image of the incident light on the imaging unit 40.

The image-forming-optical-system driving unit 34 includes a mechanism that moves the objective lens 31 in the Z direction as described above.

The image forming optical system 30 may be configured such that its optical magnification is changeable. The method of changing the optical magnification may be providing, for example, a plurality of objective lenses 31 having mutually different magnifications in the image forming optical system 30, and automatically switching the objective lens 31 among the plurality of objective lenses 31. At this time, the phase plate 32 is also changed in accordance with the change of the objective lens 31. Alternatively, the optical magnification may be changed by a user manually exchanging the objective lens 31 among the plurality of objective lenses 31.

The imaging unit 40 includes an imaging element that captures a phase-contrast image of the specimen S formed by the image forming lens 33. A CCD (charge-coupled device) image sensor, a CMOS (Complementary Metal-Oxide Semiconductor) image sensor, etc., may be used as the imaging element.

The pattern-light irradiation unit 70 irradiates the culture vessel 60 with pattern light having a previously set pattern and is used for the automatic focus control and the adjustment of the optical characteristics of the adjusting optical system 20. Specifically, the pattern-light irradiation unit 70 of this embodiment gives irradiation with pattern light having a streak-shaped pattern. The pattern-light irradiation unit 70 includes a pattern-light near-infrared light source 71 that emits near-infrared light, a grid 72 that is composed of a linear part that transmits the near-infrared light emitted from the pattern-light near-infrared light source 71 and a linear part that shields the near-infrared light, an irradiation lens 73, and a first dichroic mirror 74 that reflects the pattern light having a streak-shaped pattern of light and shade emitted from the grid 72 toward the culture vessel 60 and transmits the phase-contrast-measurement illumination light.

While the pattern light having the streak-shaped pattern of light and shade is formed by using the grid 72 in this embodiment, the method of forming the pattern light is not limited thereto. A streak-shaped pattern of light and shade may be formed by using, for example, a spatial light modulation element. The pattern of light and shade that the pattern light has is not limited to the streak-shaped pattern, and a grid pattern in which patterns of light and shade are two-dimensionally periodically arrayed may be used. Alternatively, light in which patterns of light and shade are concentrically arrayed, or light in which dot patterns are two-dimensionally arrayed may be used as the pattern light. The pattern that the pattern light has does not have to be a black and white pattern, and may be a color pattern consisting of mutually different colors.

The reflected-light detection unit 75 detects the reflected light of the pattern light reflected from the bottom surface of the culture vessel 60 because of the irradiation with the pattern light as described above. Specifically, the reflected-light detection unit 75 of this embodiment includes a half mirror 76, an optical path difference prism 77, and a first line sensor 78.

The half mirror 76 transmits the pattern light emitted from the grid 72, and reflects the reflected light reflected from the bottom surface of the culture vessel 60 because of the irradiation with the pattern light on the culture vessel 60, in a direction toward the optical path difference prism 77.

The optical path difference prism 77 divides the reflected light of the incident pattern light into two optical paths, and forms images at two different positions of the first line sensor 78. The first line sensor 78 outputs a first detection signal and a second detection signal by imaging at the two positions to the image-forming-optical-system control unit 52 of the microscope control device 50.

The image-forming-optical-system control unit 52 executes the automatic focus control by moving the objective lens 31 in the Z direction on the basis of the input first and second detection signals. Specifically, the image-forming-optical-system control unit 52 of this embodiment moves the objective lens 31 to a position at which the contrast (waveform pattern) of the first detection signal is the most approximate to the contrast (waveform pattern) of the second detection signal. While the first and second detection signals are detected by using the first line sensor 78 in this embodiment, it is not limited thereto. A CMOS image sensor or a CCD image sensor may be used.

The transmitted-light detection unit 80 detects the transmitted light transmitted through the culture liquid C in the culture vessel 60 because of the irradiation with the pattern light. Specifically, the transmitted-light detection unit 80 of this embodiment includes a second dichroic mirror 81, a condenser lens 82, a filter unit 83, and a second line sensor 84.

The second dichroic mirror 81 reflects the transmitted light transmitted through the culture liquid C in the culture vessel 60 because of the irradiation with the pattern light toward the second line sensor 84, and transmits the phase-contrast-measurement illumination light. The condenser lens 82 condenses the transmitted light reflected from the second dichroic mirror 81.

The filter unit 83 reduces incidence on the second line sensor 84 of the reflected light of the phase-contrast-measurement illumination light reflected from the liquid surface of the culture liquid C because of the irradiation with the phase-contrast-measurement illumination light on the culture liquid C. The filter unit 83 reduces incidence on the second line sensor 84 of noise fluorescent light generated by the irradiation with the pattern light being the near-infrared light on the culture liquid C. Specifically, the filter unit 83 of this embodiment includes an optical filter having optical characteristics in which a transmittance with respect to the wavelength of the near-infrared light is higher than transmittances with respect to the wavelength of the phase-contrast-measurement illumination light and the wavelength of the noise fluorescent light. That is, since the filter unit 83 reduces the incidence on the second line sensor 84 of the reflected light of the phase-contrast-measurement illumination light and the noise fluorescent light, the second line sensor 84 can detect a detection signal with only a pattern-light component by a high S/N.

Also, for example, if the above-described phase-contrast-measurement illumination-light irradiation unit 10 can switch the wavelength of the phase-contrast-measurement illumination light, the spectral characteristics of the filter unit 83 may be changed so that the intensity of the switched phase-contrast-measurement illumination light can be appropriately controlled. The method of changing the spectral characteristics of the filter unit 83 may be, for example, switching an optical filter among a plurality of optical filters. The optical filter may be switched when the user inputs a switch instruction for the optical filter by using the input device 95, or may be changed in response to an input of a switch instruction for the wavelength of the phase-contrast-measurement illumination light.

The second line sensor 84 detects the transmitted light transmitted through the culture liquid C in the culture vessel 60 because of the irradiation with the pattern light. The pattern light is transmitted through the meniscus formed at the liquid surface of the culture liquid C when the pattern light is transmitted through the culture liquid C. Hence, the intensity distribution of the transmitted light is changed depending on the state of the meniscus. This embodiment eliminates the influence of refraction of the phase-contrast-measurement illumination light caused by the meniscus, by adjusting the optical characteristics of the adjusting optical system 20 on the basis of the intensity distribution of the transmitted light.

Figure 5:
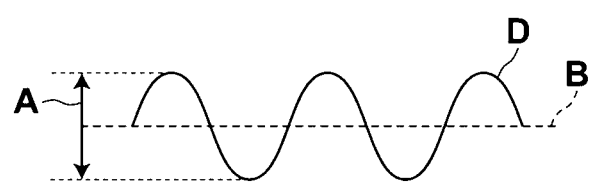
FIG. 5 is an illustration schematically showing a detection signal of transmitted light of pattern light.

The detection signal of the transmitted light detected by the second line sensor 84 is output to the adjusting-optical-system control unit 51 of the microscope control device 50. The adjusting-optical-system control unit 51 controls driving of the adjusting-optical-system driving unit 22 on the basis of the input detection signal of the transmitted light, controls the position in the X, Y, and Z directions, the optical-axis direction, and the focal power of the adjustment optical element 21, and hence adjusts the optical characteristics. FIG. 5 schematically shows a detection signal D of transmitted light. The adjusting-optical-system control unit 51 evaluates the evenness and contrast of the detection signal D of the transmitted light, and adjusts the optical characteristics of the adjusting optical system 20 on the basis of the evaluation result.

Specifically, the adjusting-optical-system control unit 51 adjusts the optical characteristics of the adjusting optical system 20 so that an amplitude A of the detection signal D of the transmitted light becomes the maximum and a center level B of the amplitude of the detection signal D is constant regardless of the position in the length direction of the second line sensor 84. The situation in which the center level B of the amplitude of the detection signal D is constant regardless of the position in the length direction of the second line sensor 84 in short represents that the variation in the density of individual streaks of the streak pattern detected by the second line sensor 84 is the minimum.

While the detection signal of the transmitted light is detected by using the second line sensor 84 in this embodiment, it is not limited thereto. A CMOS image sensor or a CCD image sensor may be used. Also, the control on the adjusting optical system 20 by the adjusting-optical-system control unit 51 is described later in detail.

The microscope control device 50 is composed of a computer including a CPU (Central Processing Unit) and a storage device.

Specifically, as shown in FIG. 1, the microscope control device 50 includes the adjusting-optical-system control unit 51 that controls the adjusting-optical-system driving unit 22, an image-forming-optical-system control unit 52 that controls the image-forming-optical-system driving unit 34, and a stage control unit 53 that controls the stage driving unit 62.

The adjusting-optical-system control unit 51 adjusts the optical characteristics of the adjusting optical system 20 on the basis of the detection signal of the transmitted light of the pattern light as described above.

The image-forming-optical-system control unit 52 executes the automatic focus control on the basis of the detection signal of the reflected light of the pattern light as described above.

The stage control unit 53 controls driving of the stage driving unit 62, and hence causes the stage 61 to move in the X, Y, and Z directions. Since the stage 61 is moved in the X and Y directions, for example, the inside of a single cell is scanned with the phase-contrast-measurement illumination light, and a phase-contrast image is captured for each of a plurality of imaging regions divided in the single cell. Also, the optical characteristics of the adjusting optical system 20 are also adjusted as described above for each of the divided imaging regions.

The input device 95 and the display device 90 are connected to the microscope control device 50. The input device 95 includes an input device, such as a keyboard and/or a mouse, and receives setting input by the user. In particular, the input device 95 according to this embodiment receives setting input for a condition for determining an adjustment condition that is used when the optical characteristics of the adjusting optical system 20 are adjusted. Specifically, the input device 95 receives setting input, such as the optical magnification of the image forming optical system 30, the type of the culture vessel 60, the type of the specimen S, the number of the specimens S, the type of the culture liquid C, the amount of the culture liquid C, the imaging position in the culture vessel 60, or the size of the imaging region in the culture vessel 60. The adjustment condition is described later in detail.

The display device 90 is composed of a display device such as a liquid crystal display. The display device 90 displays, for example, the phase-contrast image captured by the imaging unit 40. Alternatively, the display device 90 may be composed of a touch panel to which setting can be input by pressing the screen, and the display device 90 may also serve as an input device.

Figure 6:
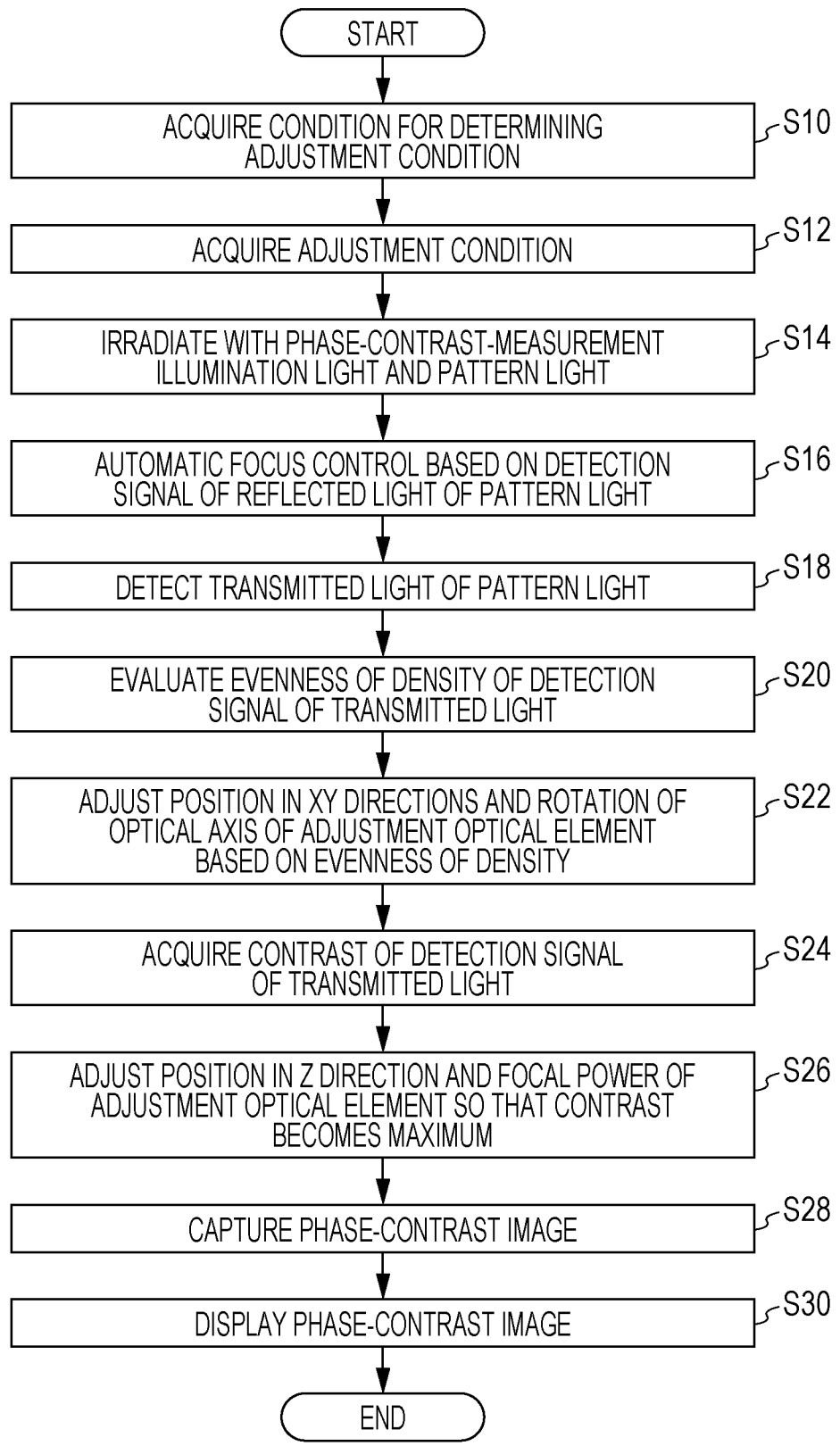
FIG. 6 is a flowchart for explaining an operation of the microscope system using the embodiment of the phase-contrast microscope of the present invention.

An operation of the microscope system according to this embodiment is described next with reference to a flowchart in FIG. 6.

First, the culture vessel 60 that houses the specimen S and the culture liquid C is installed on the stage 61. Then, the condition for determining the adjustment condition of the adjusting optical system 20 is acquired by the adjusting-optical-system control unit 51 (S10).

In this case, the adjustment condition is a condition that is used when the optical characteristics of the adjusting optical system 20 are adjusted (described later). Specifically, the adjustment condition includes an initial set value, an adjustment amount of change, an upper-limit number of times of change, and so forth, of the adjusting optical system 20.

The condition for determining the adjustment condition includes the optical magnification of the image forming optical system 30, the type of the culture vessel 60, the type of the specimen S, the number of the specimens S, the type of the culture liquid C, the amount of the culture liquid C, the environmental temperature, the environmental humidity, the imaging position in the culture vessel 60, and the size of the imaging region in the culture vessel 60. At least one of the conditions is acquired by the adjusting-optical-system control unit 51.

The above-described condition is a condition that influences the shape of the meniscus formed at the liquid surface of the culture liquid C and the focal length of the light refracted because of the meniscus. For example, the shape of the meniscus varies depending on the diameter size and depth of the culture vessel 60 regarding the type of the culture vessel 60, and the shape of the meniscus varies depending on the viscosity etc. regarding the type of the culture liquid C. Also, the shape of the meniscus varies depending on the amount of the culture liquid C. Also, the shape of the meniscus varies because the viscosity of the culture liquid C changes depending on the environmental temperature and the environmental humidity. Also, the state of the liquid surface of the culture liquid C changes depending on the type (size) and number of cells being the specimen S, and the shape of the meniscus varies.

Also, the shape of the meniscus varies depending on the imaging position in the culture vessel 60, between the case in which the imaging position is at the center position of the culture vessel 60 as shown in FIG. 1 and the case in which the imaging position is at a position shifted from the center position. Also, the focal length of the light refracted because of the meniscus varies depending on the optical magnification and the size of the imaging region of the image forming optical system 30.

Hence, the adjusting-optical-system control unit 51 acquires the condition as described above first, and the adjusting-optical-system control unit 51 acquires the adjustment condition of the adjusting optical system 20 (initial set value, adjustment amount of change, and upper-limit number of times of change) on the basis of the acquired condition (S12).

Specifically, the adjusting-optical-system control unit 51 acquires, as the initial set value of the adjusting optical system 20, an initial set value when the position of the adjustment optical element 21 in the X, Y, and Z directions is adjusted; an initial set value when the rotation angle ($\theta$, $\phi$, $\rho$) of the optical axis of the adjustment optical element 21 is adjusted, and an initial set value when the focal power of the adjustment optical element 21 is adjusted. The initial set value when the focal power of the adjustment optical element 21 is adjusted may be an initial set value of a voltage that is applied to the liquid crystal lens or the spatial light modulator, an initial set value of the amount of liquid that is injected into the liquid lens, etc.

Also, the adjusting-optical-system control unit 51 acquires an adjustment amount of change and an upper-limit number of times of change per single adjustment when the position of the adjustment optical element 21 in the X, Y, and Z directions is adjusted; an adjustment amount of change and an upper-limit number of times of change per single adjustment when the rotation angle ($\theta$, $\phi$, $\rho$) of the optical axis of the adjustment optical element 21 is adjusted; and an adjustment amount of change and an upper-limit number of times of change per single adjustment when the focal power of the adjustment optical element 21 is adjusted.

An adjustment condition of the adjusting optical system 20 as described above may be acquired by previously storing a table in which a condition for determining an adjustment condition and the adjustment condition are associated with each other in the adjusting-optical-system control unit 51, and by referencing the table.

Since the adjustment condition corresponding to each condition is acquired and the adjustment operation range when the optical characteristics of the adjusting optical system 20 are adjusted is limited, the adjustment time for the optical characteristics of the adjusting optical system 20 (described later) can be decreased, and the adjustment operation range can be narrowed. Hence the size of the adjusting optical system 20 can be reduced.

Next, the stage 61 is moved in the X and Y directions by the stage driving unit 62, is set at a position at which a first imaging region among a plurality of imaging regions in the culture vessel 60 is irradiated with the phase-contrast-measurement illumination light and the pattern light, and the culture vessel 60 is irradiated with the phase-contrast-measurement illumination light and the pattern light (S14).

Then, the reflected light reflected from the bottom surface of the culture vessel 60 because of the irradiation with the pattern light is detected by the first line sensor 78 of the reflected-light detection unit 75, and the first and second detection signals based on the detected reflected light are output to the image-forming-optical-system control unit 52. The image-forming-optical-system control unit 52 executes the automatic focus control by moving the objective lens 31 in the Z direction on the basis of the input first and second detection signals (S16).

In contrast, the transmitted light transmitted through the culture liquid C in the culture vessel 60 is detected by the second line sensor 84 of the transmitted-light detection unit 80 (S18). The detection signal based on the transmitted light detected by the second line sensor 84 is output to the adjusting-optical-system control unit 51. The adjusting-optical-system control unit 51 adjusts the optical characteristics of the adjusting optical system 20 on the basis of the detection signal based on the transmitted light of the pattern light, after the automatic focus control based on the above-described detection signal of the reflected light of the pattern light.

Specifically, the adjusting-optical-system control unit 51 evaluates the evenness of the density of the detection signal of the transmitted light as described above, and outputs a control signal to the adjusting-optical-system driving unit 22 on the basis of the evaluation result (S20). For example, if the variation in the density of the individual streaks of the streak pattern detected by the second line sensor 84 is a previously set threshold or larger, the adjusting-optical-system control unit 51 outputs a control signal to the adjusting-optical-system driving unit 22 so as to decrease the variation.

The adjusting-optical-system driving unit 22 adjusts the position in the X and Y directions of the adjustment optical element 21 and the rotation of the optical axis of the adjustment optical element 21 on the basis of the input control signal, by only the above-described adjustment amounts of change (S22).

Then, the detection signal of the transmitted light of the pattern light is input to the adjusting-optical-system control unit 51 again. The adjusting-optical-system control unit 51 evaluates the evenness of the input detection signal of the transmitted light again, and if the variation in the density is the previously set threshold or larger, the adjusting-optical-system control unit 51 outputs the control signal to the adjusting-optical-system driving unit 22 again. The adjusting-optical-system driving unit 22 adjusts the position in the X and Y directions of the adjustment optical element 21 and the rotation of the optical axis of the adjustment optical element 21 again on the basis of the input control signal, by only the above-described adjustment amounts of change.

As described above, the evaluation for the evenness of the density of the detection signal of the transmitted light and the adjustment for the position in the X and Y directions and the rotation of the optical axis of the adjustment optical element 21 on the basis of the evaluation result are repeated by a number not larger than the above-described upper-limit number of times of change, and the position in the X and Y directions and the rotation of the optical axis of the adjustment optical element 21 are adjusted so as to decrease the variation in the density of the detection signal of the transmitted light.

After the position in the X and Y directions and the rotation of the optical axis of the adjustment optical element 21 are adjusted as described above, the adjusting-optical-system control unit 51 acquires the contrast of the detection signal of the transmitted light (S24). If the contrast of the detection signal of the transmitted light is equal to or smaller than a predetermined threshold, the adjusting-optical-system control unit 51 outputs a control signal to the adjusting-optical-system driving unit 22. The adjusting-optical-system driving unit 22 adjusts the position in the Z direction of the adjustment optical element 21 and the focal power of the adjustment optical element 21 on the basis of the input control signal, by only the above-described adjustment amounts of change.

Then, the detection signal of the transmitted light of the pattern light is input to the adjusting-optical-system control unit 51 again. The adjusting-optical-system control unit 51 acquires the contrast of the input detection signal of the transmitted light again, and if the contrast is equal to or smaller than the predetermined threshold, the adjusting-optical-system control unit 51 outputs the control signal to the adjusting-optical-system driving unit 22 again. The adjusting-optical-system driving unit 22 adjusts the position in the Z direction of the adjustment optical element 21 and the focal power of the adjustment optical element 21 again on the basis of the input control signal, by only the above-described adjustment amounts of change.

As described above, the evaluation for the contrast of the detection signal of the transmitted light and the adjustment for the position in the Z direction and the focal power of the adjustment optical element 21 on the basis of the evaluation result are repeated by a number not larger than the above-described upper-limit number of times of change, and the position in the Z direction and the focal power of the adjustment optical element 21 are adjusted so that the contrast of the detection signal of the transmitted light becomes the maximum (S26).

Then, after the position in the Z direction and the focal power of the adjustment optical element 21 are adjusted, the imaging unit 40 captures a phase-contrast image because of irradiation with the phase-contrast-measurement illumination light (S28).

Then, the optical characteristics of the adjusting optical system 20 are adjusted and the phase-contrast image is captured for each imaging region as described above by moving the stage 61 in the X and Y directions by the stage driving unit 62, and phase-contrast images of respective imaging regions are sequentially stored in a storage unit of the microscope control device 50.

Then, the phase-contrast images of the respective imaging regions are combined in the microscope control device 50. The composite phase-contrast image is displayed on the display device 90 (S30).

With the microscope system of the above-described embodiment, the culture vessel 60 is irradiated with the pattern light having the pattern that is previously set for the culture vessel 60, the transmitted light transmitted through the culture liquid C in the culture vessel 60 because of the irradiation with the pattern light is detected, and the optical characteristics of the adjusting optical system 20 are adjusted on the basis of the detection signal based on the detected transmitted light. Accordingly, the influence of the refraction of the phase-contrast-measurement illumination light can be automatically adjusted. Further, as compared with the case where the arithmetic processing is executed on the coordinate data of the above-described ring-shaped image, the arithmetic load of the arithmetic processing based on the detection signal of the pattern light can be decreased. Hence, the above-described influence of the refraction of the phase-contrast-measurement illumination light can be quickly adjusted.

After the optical characteristics of the adjusting optical system 20 are adjusted, the culture vessel 60 is irradiated with the phase-contrast-measurement illumination light and the specimen S is imaged. Hence, a high-contrast phase-contrast image with an artifact caused by a meniscus reduced can be captured.

Also, in the microscope system of the above-described embodiment, both the adjustment of the optical characteristics of the adjusting optical system 20 and the automatic focus control on the image forming optical system 30 are executed by using the single pattern light. Hence, as compared with, for example, a case where the optical characteristics of the adjusting optical system 20 are adjusted in a system totally different from the system of the automatic focus control, these processing can be quickly executed.

Also, in the microscope system of the above-described embodiment, the optical characteristics of the adjusting optical system 20 are adjusted after the automatic focus control based on the detection signal of the pattern light. Hence, these processing can be executed with high precision.

Figure 7:
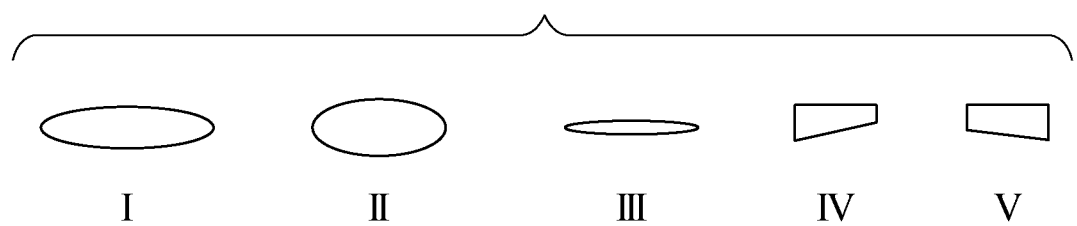
FIG. 7 provides schematic illustrations of lenses when an adjusting optical system is composed of a plurality of lenses.

While the focal power of the adjustment optical element 21 is adjusted by adjusting the voltage to be applied to the adjustment optical element 21 or the amount of liquid to be injected into the adjustment optical element 21 in the microscope system of the above-described embodiment, it is not limited thereto. For example, a plurality of lenses with mutually different curvature radii as shown in FIG. 7I to FIG. 7III may be provided as the adjusting optical system 20, the lens may be automatically switched among these lenses, and hence the focal power may be adjusted. Also, regarding the method of rotating the optical axis of the adjustment optical element 21, a plurality of lenses with mutually different light emission angles, for example, as shown in FIG. 7IV and FIG. 7V may be provided, the lens may be automatically switched among these lenses, and hence the optical axis direction of the adjustment optical element 21 may be adjusted. Also, the focal power and the rotation of the optical axis may be adjusted by using a combination of a plurality of types of lenses as shown in FIG. 7I to FIG. 7V.

Also, while the focal power of the adjusting optical system 20 is adjusted in the microscope system of the above-described embodiment, only the position in the X, Y, and Z directions of the adjustment optical element 21 and the rotation of the optical axis of the adjustment optical element 21 may be adjusted without adjusting the focal power.

Also, while the adjustment optical element 21 is provided for eliminating the influence of the refraction of the phase-contrast-measurement illumination light caused by the meniscus formed at the liquid surface in the microscope system of the above-described embodiment, the adjustment optical element 21 is not necessarily provided. The influence of the refraction of the phase-contrast-measurement illumination light caused by the meniscus may be eliminated, for example, by moving the slit plate 12 in the X and Y directions, or by moving the phase plate 32 in the X and Y directions. That is, the slit plate 12 or the phase plate 32 may be used as the adjusting optical system according to the present invention.

Also, while the adjusting optical system 20 is adjusted by evaluating both the evenness and contrast of the detection signal of the transmitted light of the pattern light in the microscope system of the above-described embodiment, the adjusting optical system 20 may be adjusted by evaluating only one of the evenness and contrast.

Described next is a microscope system of another embodiment that adjusts the optical characteristics of the adjusting optical system 20 on the basis of a phase-contrast image that is captured by the imaging unit 40 because of the irradiation with the phase-contrast-measurement illumination light, instead of adjusting the optical characteristics of the adjusting optical system 20 on the basis of the detection signal of the transmitted light of the pattern light like the microscope system of the above-described embodiment.

A phase-contrast microscope main body in a microscope system of this embodiment includes a phase-contrast-measurement illumination-light irradiation unit that irradiates a vessel that houses a liquid and a specimen, with illumination light for phase-contrast measurement; an imaging unit that images the specimen irradiated with the illumination light; an image forming optical system that forms an image of the specimen caused by the irradiation with the illumination light, on the imaging unit; an adjusting optical system that adjusts refraction of the illumination light caused by a shape of a liquid surface of the liquid in the vessel; an adjusting-optical-system control unit that adjusts optical characteristics of the adjusting optical system on the basis of a phase-contrast image captured by the imaging unit; and an image-forming-optical-system control unit that executes automatic focus control on the image forming optical system on the basis of a phase-contrast image captured by the imaging unit. The imaging unit acquires a low-resolution phase-contrast image with a relatively low resolution as the phase-contrast image to be used for adjusting the optical characteristics of the adjusting optical system, and acquires a high-resolution phase-contrast image with a relatively high resolution as the phase-contrast image to be used for executing the automatic focus control on the image forming optical system.

Figure 8:
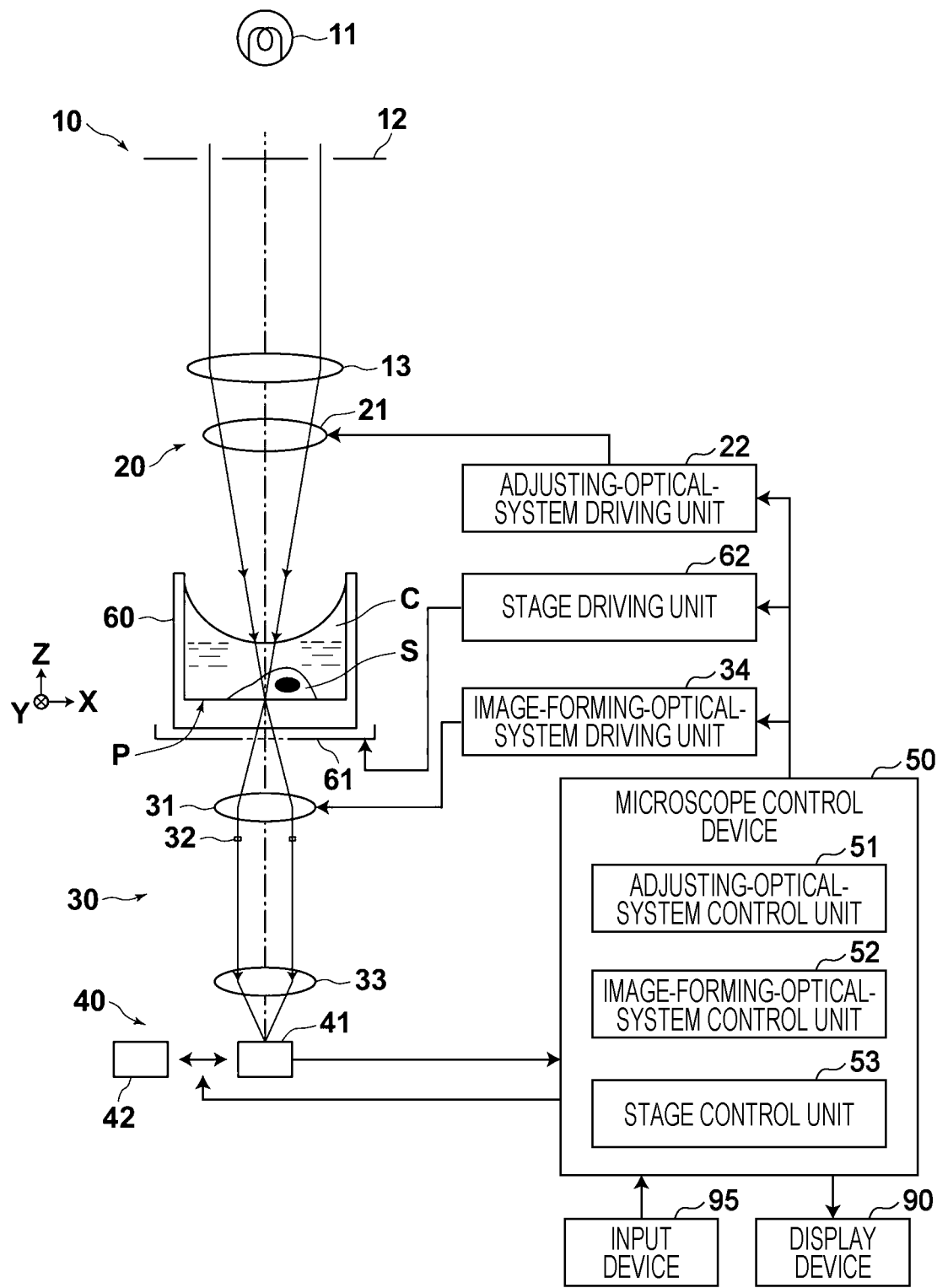
FIG. 8 is an illustration showing a general configuration of a microscope system using another embodiment.

FIG. 8 is an illustration showing a general configuration of the microscope system of this embodiment. The microscope system of this embodiment includes, as shown in FIG. 8, a phase-contrast-measurement illumination-light irradiation unit 10, an adjusting optical system 20, an image forming optical system 30, an imaging unit 40, a stage 61, a stage driving unit 62, a microscope control device 50, a display device 90, and an input device 95. The configurations other than the imaging unit 40 are similar to those of the above-described embodiment.

The imaging unit 40 of the microscope system of this embodiment, as described above, acquires the low-resolution phase-contrast image with the relatively low resolution as the phase-contrast image to be used for adjusting the optical characteristics of the adjusting optical system 20, and acquires the high-resolution phase-contrast image with the relatively high resolution as the phase-contrast image to be used for executing the automatic focus control on the image forming optical system 30. Specifically, the imaging unit 40 of this embodiment includes two imaging elements 41 and 42 with different resolutions. The imaging unit 40 acquires the low-resolution phase-contrast image by using the relatively-low-resolution imaging element 42 to capture the phase-contrast image to be used for adjusting the optical characteristics of the adjusting optical system 20, and acquires the high-resolution phase-contrast image by using the relatively-high-resolution imaging element 41 to capture the phase-contrast image to be used for executing the automatic focus control on the image forming optical system 30.

CCD image sensors or CMOS image sensors may be used as the imaging elements 41 and 42 like the above-described embodiment.

Figure 9:
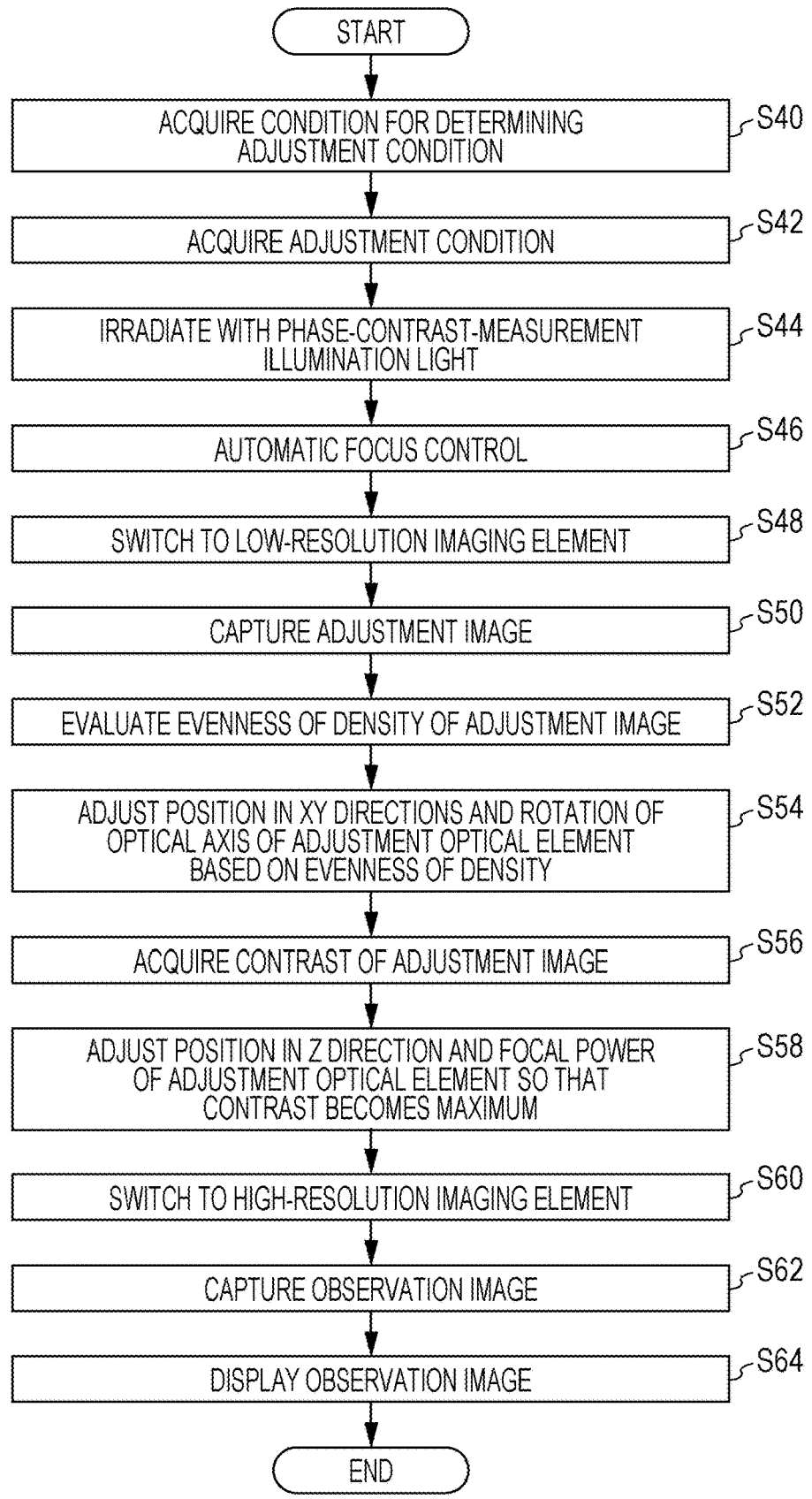
FIG. 9 is a flowchart for explaining an operation of the microscope system using the other embodiment.
Figure 10:
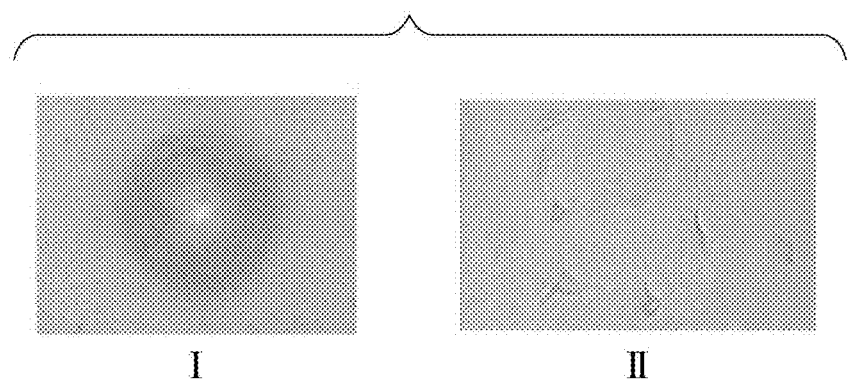
FIG. 10 provides illustrations showing example images when cells in a culture liquid are imaged with a conventional phase-contrast microscope.
Figure 11:
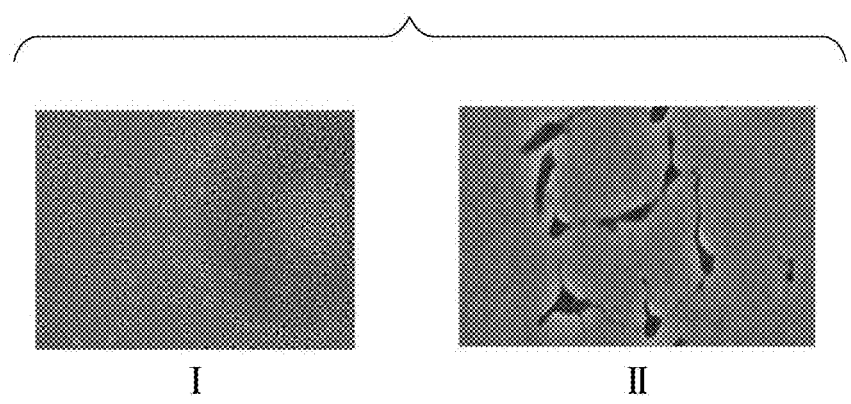
FIG. 11 provides illustrations showing example images when cells are imaged with a conventional phase-contrast microscope in a state without a culture liquid.

An operation of the microscope system according to this embodiment is described next with reference to a flowchart in FIG. 9.

First, a culture vessel 60 that houses a specimen S and a culture liquid C is installed on the stage 61. Then, a condition for determining an adjustment condition of the adjusting optical system 20 is acquired by the adjusting-optical-system control unit 51 (S40). The condition for determining the adjustment condition is similar to that of the above-described embodiment.

The adjusting-optical-system control unit 51 acquires the adjustment condition of the adjusting optical system 20 (initial set value, adjustment amount of change, and upper-limit number of times of change) on the basis of the acquired condition (S42).

Next, the stage 61 is moved in the X and Y directions by the stage driving unit 62, is set at a position at which a first imaging region among a plurality of imaging regions in the culture vessel 60 is irradiated with phase-contrast-measurement illumination light, and the culture vessel 60 is irradiated with the phase-contrast-measurement illumination light (S44).

Then, a control signal is output from the image-forming-optical-system control unit 52 to the image-forming-optical-system driving unit 34. The image-forming-optical-system driving unit 34 moves an objective lens 31 of the image forming optical system 30 in the Z direction on the basis of the input control signal. Then, image signals indicative of phase-contrast images sequentially captured by the imaging unit 40 along with the movement of the objective lens 31 in the Z direction are input to the image-forming-optical-system control unit 52. The image-forming-optical-system control unit 52 executes the automatic focus control on the basis of the input image signals (S46). Specifically, the image-forming-optical-system control unit 52 specifies the position of the objective lens 31 at which the contrast of the input image signal becomes the maximum, and sets the position of the objective lens 31 at the specified position. At this time, the imaging unit 40 captures a high-resolution phase-contrast image by using the relatively-high-resolution imaging element 41 as described above.

After the imaging-optical-system control unit 52 executes the automatic focus control, the imaging unit 40 switches the imaging element from the high-resolution imaging element 41 to the low-resolution imaging element 42 (S48). The low-resolution imaging element 42 captures a low-resolution phase-contrast image for adjusting the optical characteristics of the adjusting optical system 20, as an adjustment image (S50). The adjustment image captured by the low-resolution imaging element 42 of the imaging unit 40 is input to the adjusting-optical-system control unit 51.

The adjusting-optical-system control unit 51 acquires a feature amount that represents the evenness of the density of the input adjustment image (S52). If the evenness of the density of the adjustment image is not appropriate, the adjusting-optical-system control unit 51 outputs a control signal to the adjusting-optical-system driving unit 22.

The state in which the evenness of the density of the adjustment image is appropriate is, for example, a state in which a ring-shaped image that appears in the adjustment image has a substantially rotationally symmetric shape. At this time, the ring-shaped image does not necessarily have the rotationally symmetric shape, and may be adjusted to have a shape closest to the rotationally symmetric shape.

The feature amount of the adjustment image acquired at this time is, for example, background information of the adjustment image. Specifically, an image with low-frequency components is acquired by providing low-pass filter processing on the adjustment image. Then, a ring-shaped image is extracted from the image with low-frequency components, a shift amount from the rotational symmetry is calculated by executing, for example, pattern matching, and if the shift amount is larger than a predetermined threshold, a control signal is output to the adjusting-optical-system driving unit 22.

The adjusting-optical-system driving unit 22 adjusts the position in the X and Y directions of the adjustment optical element 21 and the rotation of the optical axis of the adjustment optical element 21 on the basis of the input control signal, by only the above-described adjustment amounts of change (S54).

The adjustment image is acquired by the imaging element 42 of the imaging unit 40, and is input to the adjusting-optical-system control unit 51 again. The adjusting-optical-system control unit 51 acquires the feature amount that represents the evenness of the density of the input adjustment image again, and if the evenness of the density of the adjustment image is not in the appropriate state, the adjusting-optical-system control unit 51 outputs the control signal to the adjusting-optical-system driving unit 22 again. The adjusting-optical-system driving unit 22 adjusts the position in the X and Y directions of the adjustment optical element 21 and the rotation of the optical axis of the adjustment optical element 21 again on the basis of the input control signal, by only the above-described adjustment amounts of change.

As described above, the capture of the adjustment image, and the adjustment for the position in the X and Y directions and the rotation of the optical axis of the adjustment optical element 21 on the basis of the feature amount that represents the evenness of the density of the adjustment image are repeated by a number not larger than the above-described upper-limit number of times of change, and the position in the X and Y directions and the rotation of the optical axis of the adjustment optical element 21 are adjusted so that the evenness of the density of the adjustment image becomes the appropriate state.

After the position in the X and Y directions and the rotation of the optical axis of the adjustment optical element 21 are adjusted as described above, the adjusting-optical-system control unit 51 acquires a feature amount that represents the contrast of the adjustment image (S56). If the contrast of the adjustment image is not in an appropriate state, the adjusting-optical-system control unit 51 outputs a control signal to the adjusting-optical-system driving unit 22. The adjusting-optical-system driving unit 22 adjusts the position in the Z direction of the adjustment optical element 21 and the focal power of the adjustment optical element 21 on the basis of the input control signal, by only the above-described adjustment amounts of change.

As the feature amount that represents the contrast of the adjustment image, for example, an image with high-frequency components is acquired by executing, for example, high-pass filter processing on the adjustment image. A contrast is calculated from the image with high-frequency components, and if the contrast is equal to or smaller than a predetermined threshold, a control signal is output to the adjusting-optical-system driving unit 22.

An adjustment image is acquired by the imaging element 42 of the imaging unit 40 again, and is input to the adjusting-optical-system control unit 51. The adjusting-optical-system control unit 51 acquires the feature amount that represents the contrast of the input adjustment image again, and if the contrast of the adjustment image is not in the appropriate state, the adjusting-optical-system control unit 51 outputs the control signal to the adjusting-optical-system driving unit 22 again. The adjusting-optical-system driving unit 22 adjusts the position in the Z direction of the adjustment optical element 21 and the focal power of the adjustment optical element 21 again on the basis of the input control signal, by only the above-described adjustment amounts of change.

As described above, the capture of the adjustment image, and the adjustment for the position in the Z direction and the focal power of the adjustment optical element 21 on the basis of the feature amount that represents the contrast of the adjustment image are repeated by a number not larger than the above-described upper-limit number of times of change, and the position in the Z direction and the focal power of the adjustment optical element 21 are adjusted so that the contrast of the adjustment image becomes the maximum (S58).

After the position in the Z direction and the focal power of the adjustment optical element 21 are adjusted, the imaging unit 40 switches the imaging element from the low-resolution imaging element 42 to the high-resolution imaging element 41 again (S60). The high-resolution imaging element 41 captures a high-resolution phase-contrast image as an observation image (S62).

Then, the optical characteristics of the adjusting optical system 20 are adjusted and the observation image is captured for each imaging region as described above by moving the stage 61 in the X and Y directions by the stage driving unit 62. Observation images of respective imaging regions are sequentially stored in a storage unit of the microscope control device 50.

Then, the observation images of the respective imaging regions are combined by the microscope control device 50. The composite observation image is displayed on the display device 90 (S64).

With the microscope system of the above-described other embodiment, the transmitted-light detection unit 80 that detects the transmitted light of the pattern light like the former embodiment is not required to be provided, and hence the phase-contrast microscope main body can be reduced in size, and the cost thereof can be reduced.

Also, the high-resolution phase-contrast image is used during the automatic focus control, and hence the automatic focus control with high precision can be executed. In contrast, when the optical characteristics of the adjusting optical system 20 are adjusted, the evenness of the image is mainly evaluated as described above. Hence, a phase-contrast image with a resolution as high as the resolution in the case of the automatic focus control is not required to be used. When the optical characteristics of the adjusting optical system 20 are adjusted, the arithmetic load of the arithmetic operation of the feature amount that represents the evenness and the feature amount that represents the contrast can be decreased by using the low-resolution phase-contrast image. The optical characteristics of the adjusting optical system 20 can be quickly adjusted.

While the low-resolution phase-contrast image and the high-resolution phase-contrast image are captured by switching the imaging element between the two imaging elements with the different resolutions in the microscope system of the above-described other embodiment, it is not limited thereto. For example, a low-resolution phase-contrast image may be acquired by executing what is called binning reading by using a single high-resolution imaging element. For a high-resolution phase-contrast image, normal reading may be executed without executing the binning reading. The binning reading is a reading method of collectively reading out electric charge signals of a plurality of adjacent photoelectric conversion elements in an imaging element and acquiring the collectively read signals as a single pixel signal.

Also, instead of executing the binning reading, the imaging unit 40 may read out a high-resolution phase-contrast image from a single high-resolution imaging element, and then may acquire a low-resolution phase-contrast image by adding a plurality of adjacent pixel signals in the high-resolution phase-contrast image.

REFERENCE SIGNS LIST 10 phase-contrast-measurement illumination-light irradiation unit
11 phase-contrast-measurement white-light source
12 slit plate
12a slit
12b light screen
13 condenser lens
20 adjusting optical system
21 adjustment optical element
22 adjusting-optical-system driving unit
30 image forming optical system
31 objective lens
32 phase plate
32a phase ring
32b transparent plate
33 image forming lens
34 image-forming-optical-system driving unit
40 imaging unit
41, 42 imaging element
50 microscope control device
51 adjusting-optical-system control unit
52 image-forming-optical-system control unit
53 stage control unit
60 culture vessel
61 stage
62 stage driving unit
70 pattern light irradiation unit
71 pattern-light near-infrared light source
72 grid
73 irradiation lens
74 first dichroic mirror
75 reflected-light detection unit
76 half mirror
77 optical path difference prism
78 first line sensor
80 transmitted-light detection unit
81 second dichroic mirror
82 condenser lens
83 filter unit 84 second line sensor
90 display device
95 input device

What is claimed is:

1. A phase-contrast microscope, comprising:
a phase-contrast-measurement illumination-light irradiation unit that irradiates a vessel that houses a liquid and a specimen, with illumination light for phase-contrast measurement;
an imaging unit that images the specimen irradiated with the illumination light;
an adjusting optical system that has adjustable optical characteristics and adjusts refraction of the illumination light caused by a shape of a liquid surface of the liquid in the vessel in accordance with the optical characteristic;
a pattern-light irradiation unit that irradiates the liquid surface of the liquid in the vessel with pattern light having a pattern, the pattern-light irradiation unit differing from the phase-contrast-measurement illumination-light irradiation unit;
a transmitted-light detection unit that detects transmitted light transmitted through the liquid surface of the liquid in the vessel because of the irradiation with the pattern light; and
an adjusting-optical-system control unit that adjusts the optical characteristics of the adjusting optical system on the basis of a detection signal based on the transmitted light detected by the transmitted-light detection unit.

2. The phase-contrast microscope according to claim 1, further comprising:
an image forming optical system that forms an image of the specimen caused by the irradiation with the illumination light, on the imaging unit, and is subject to automatic focus control;
a reflected-light detection unit that detects reflected light of the pattern light reflected from a bottom surface of the vessel because of the irradiation with the pattern light; and
an image-forming-optical-system control unit that executes the automatic focus control on the image forming optical system on the basis of a detection signal based on the reflected light detected by the reflected-light detection unit.

3. The phase-contrast microscope according to claim 2, wherein the adjusting-optical-system control unit adjusts the optical characteristics of the adjusting optical system on the basis of at least one evaluation result of evenness or contrast of the detection signal based on the transmitted light.

4. The phase-contrast microscope according to claim 3, further comprising:
a filter unit that reduces incidence on the transmitted-light detection unit of reflected light of the illumination light reflected from the liquid surface of the liquid in the vessel because of the irradiation with the illumination light.

5. The phase-contrast microscope according to claim 4, wherein the filter unit has spectral characteristics that are changeable in accordance with a wavelength of the illumination light.

6. The phase-contrast microscope according to claim 2, further comprising:
a filter unit that reduces incidence on the transmitted-light detection unit of reflected light of the illumination light reflected from the liquid surface of the liquid in the vessel because of the irradiation with the illumination light.

7. The phase-contrast microscope according to claim 2, wherein the adjusting-optical-system control unit adjusts the optical characteristics of the adjusting optical system after the automatic focus control by the image-forming-optical-system control unit.

8. The phase-contrast microscope according to claim 1, wherein the adjusting-optical-system control unit adjusts the optical characteristics of the adjusting optical system on the basis of at least one evaluation result of evenness or contrast of the detection signal based on the transmitted light.

9. The phase-contrast microscope according to claim 8, further comprising:
a filter unit that reduces incidence on the transmitted-light detection unit of reflected light of the illumination light reflected from the liquid surface of the liquid in the vessel because of the irradiation with the illumination light.

10. The phase-contrast microscope according to claim 1, further comprising:
a filter unit that reduces incidence on the transmitted-light detection unit of reflected light of the illumination light reflected from the liquid surface of the liquid in the vessel because of the irradiation with the illumination light.

11. The phase-contrast microscope according to claim 10, wherein the filter unit has spectral characteristics that are changeable in accordance with a wavelength of the illumination light.

12. The phase-contrast microscope according to claim 1, wherein the pattern light has a streak-shaped pattern.

13. The phase-contrast microscope according to claim 1, wherein the adjusting optical system has an optical element having an adjustable focal power.

14. The phase-contrast microscope according to claim 13, wherein the optical element has a curvature at at least one of an incidence surface or an exit surface of the illumination light.

15. The phase-contrast microscope according to claim 14, wherein the curvature of the optical element is adjustable.

16. The phase-contrast microscope according to claim 1, wherein the adjusting-optical-system control unit acquires an adjustment condition of the adjusting optical system, and adjusts the optical characteristics of the adjusting optical system on the basis of the adjustment condition.

17. The phase-contrast microscope according to claim 16, wherein the adjustment condition is determined on the basis of at least one of an optical magnification of the image forming optical system that forms the image of the specimen, a type of the vessel, a type of the specimen, the number of the specimens, a type of the liquid, an amount of the liquid, an environmental temperature, an environmental humidity, an imaging position in the vessel, or a size of an imaging region in the vessel.

18. The phase-contrast microscope according to claim 1, wherein the phase-contrast-measurement illumination-light irradiation unit has a light source and a slit plate provided with a slit through which light emitted from the light source passes, and
wherein the specimen is irradiated with the light passing through the slit plate, as the illumination light.

19. The phase-contrast microscope according to claim 1, wherein the pattern light having a pattern is a pattern light having a streak-shaped pattern of light and shade, a pattern light having a grid pattern in which patterns of light and shade are two-dimensionally periodically arrayed, a pattern light in which patterns of light and shade are concentrically arrayed, or a pattern light in which dot patterns are two-dimensionally arrayed.

20. The phase-contrast microscope according to claim 1, further comprising:
   a reflected-light detection unit that detects reflected light of the pattern light reflected from a bottom surface of the vessel because of the irradiation with the pattern light.

21. An imaging method, comprising:
   irradiating a liquid surface of a liquid in a vessel that houses the liquid and a specimen, with pattern light having a pattern;
   detecting transmitted light transmitted through the liquid surface of the liquid in the vessel because of the irradiation with the pattern light;
   adjusting optical characteristics of an adjusting optical system that adjusts refraction of light caused by a shape of the liquid surface of the liquid in the vessel in accordance with the optical characteristic, on the basis of a detection signal based on the detected transmitted light;
   after the adjustment, irradiating the vessel with illumination light for phase-contrast measurement, the illumination light differing from the pattern light; and
   imaging the specimen irradiated with the illumination light.

* * * * *